(12) United States Patent
Visona' et al.

(10) Patent No.: US 7,144,358 B2
(45) Date of Patent: *Dec. 5, 2006

(54) METHOD AND APPARATUS FOR MANUFACTURING TUBE-SHAPED PACKAGES MADE OF FLEXIBLE MATERIAL

(75) Inventors: Sergio Visona', Chiuppano (IT); Giorgio Trani, Venice (IT); Marion Sterner, Rosenheim (IT)

(73) Assignee: BP Europack S.p.A. (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/819,010

(22) Filed: Apr. 6, 2004

(65) Prior Publication Data

US 2004/0192530 A1 Sep. 30, 2004

Related U.S. Application Data

(63) Continuation of application No. 10/277,896, filed on Oct. 23, 2002, now abandoned, which is a continuation of application No. 09/485,159, filed as application No. PCT/EP99/03709 on May 28, 1999, now Pat. No. 6,510,673.

(30) Foreign Application Priority Data

Jun. 4, 1998 (IT) .............................. VE98A0023

(51) Int. Cl.
*B31C 5/00* (2006.01)
*B65B 9/00* (2006.01)

(52) U.S. Cl. ..................... 493/269; 493/156; 493/167; 493/189; 53/451; 53/477; 53/551

(58) Field of Classification Search ................. 53/451, 53/551, 477, 471; 493/89, 156, 167, 189, 493/193, 215, 143, 209, 170; 383/104, 107, 383/120, 122, 269

See application file for complete search history.

(56) References Cited

U.S. PATENT DOCUMENTS

| 3,380,646 | A | * | 4/1968 | Louis et al. ................. 383/104 |
| 3,935,993 | A | * | 2/1976 | Doyen et al. .................. 383/94 |
| 5,059,036 | A | * | 10/1991 | Richison et al. ........... 383/61.2 |
| 6,120,183 | A | * | 9/2000 | Buchanan et al. ........... 383/122 |
| 6,361,485 | B1 | * | 3/2002 | Robertson .................... 493/167 |
| 6,428,456 | B1 | * | 8/2002 | Visona' et al. .............. 493/133 |
| 2005/0069230 | A1 | * | 3/2005 | Takahashi et al. .......... 383/104 |

FOREIGN PATENT DOCUMENTS

WO WO 96/10524 * 4/1996

\* cited by examiner

*Primary Examiner*—Louis K. Huynh
*Assistant Examiner*—Thanh Truong
(74) *Attorney, Agent, or Firm*—Rissman Jobse Hendricks & Oliverio, LLP

(57) ABSTRACT

Method for manufacturing a tube-shaped package having longitudinal sides and a bottom and made of flexible material, wherein the longitudinal sides of the package are sealed prior to forming the bottom and the bottom is formed by pushing an annular portion of the flexible material inward in a U-shaped arrangement at at least on closed end of the tube-shaped package.

5 Claims, 3 Drawing Sheets

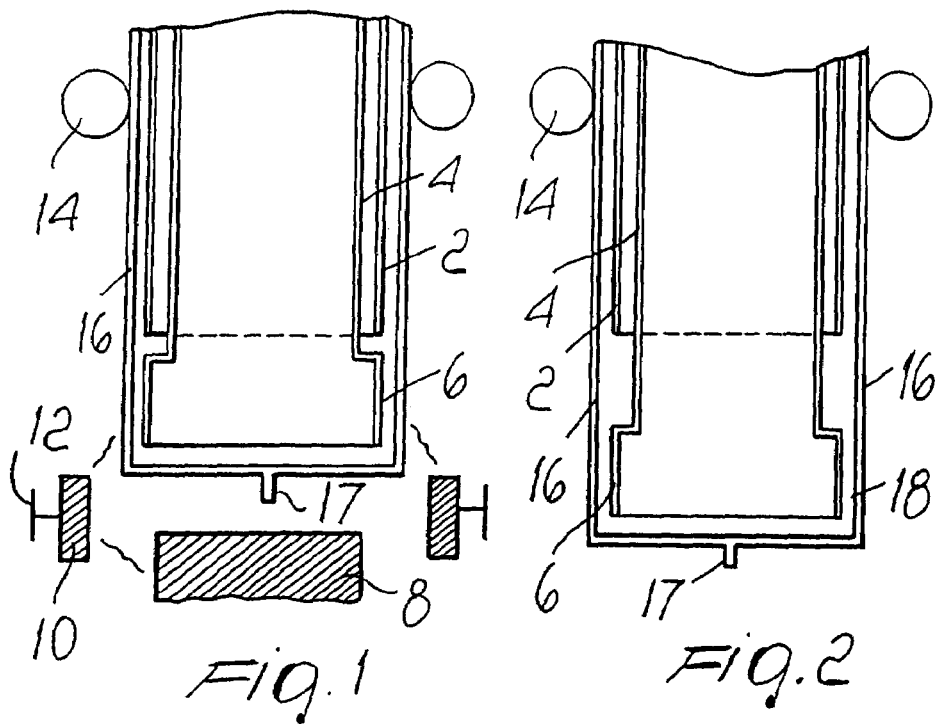
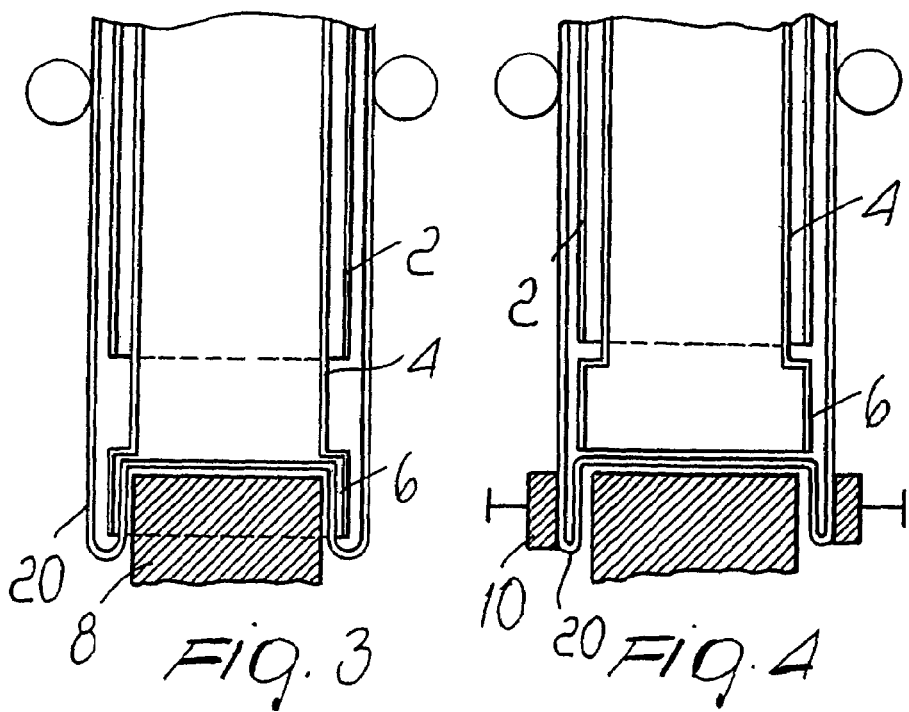

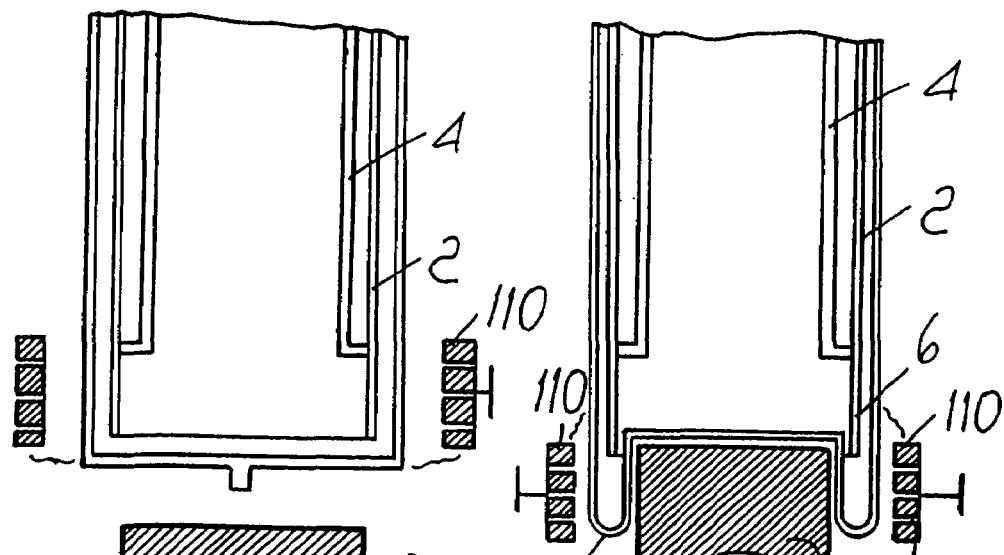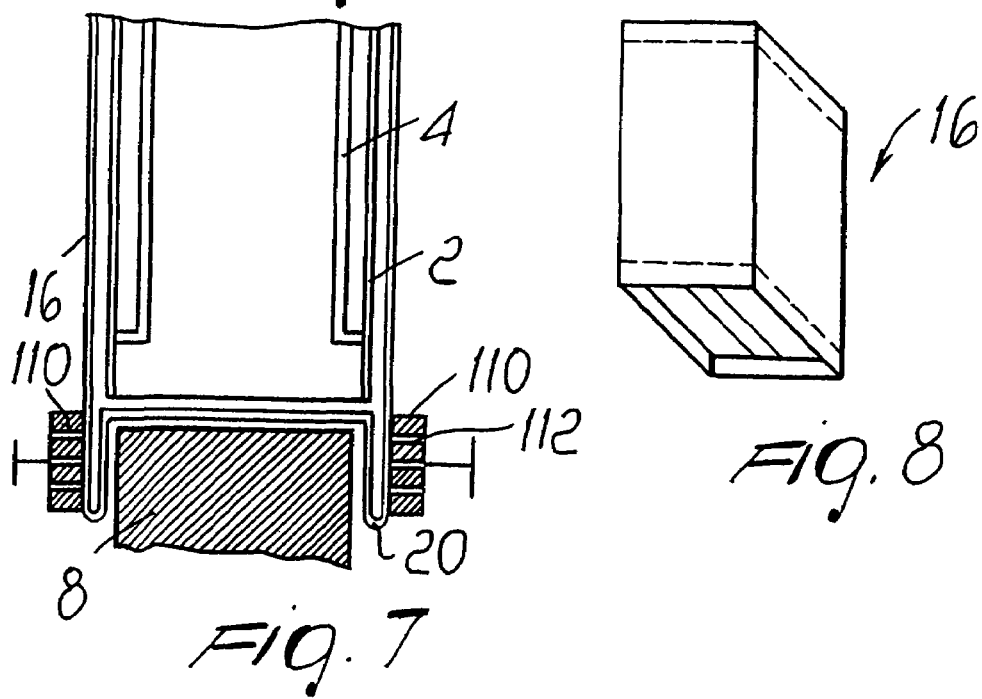

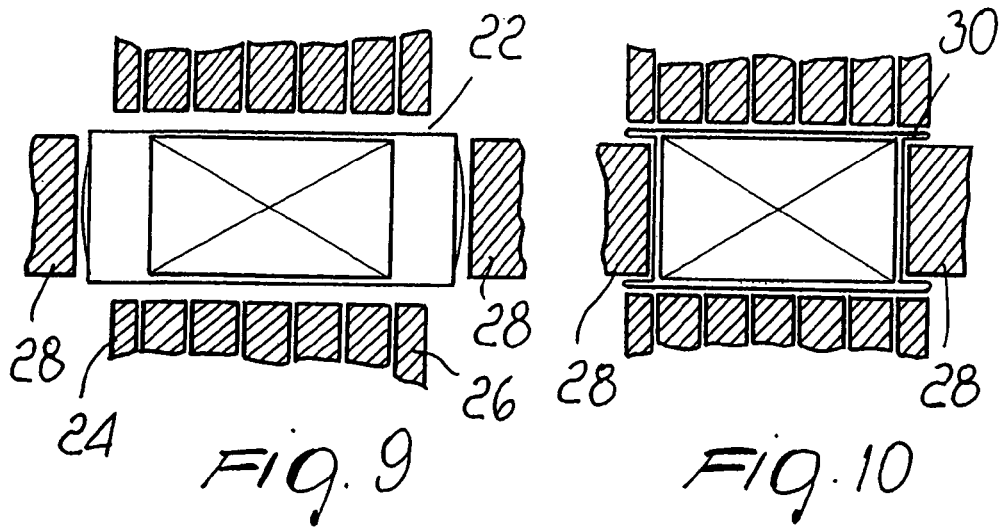
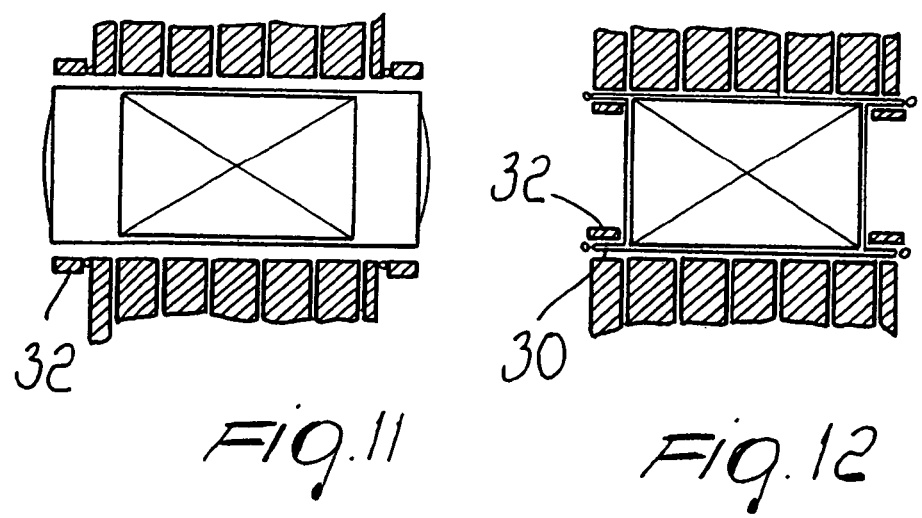

METHOD AND APPARATUS FOR MANUFACTURING TUBE-SHAPED PACKAGES MADE OF FLEXIBLE MATERIAL

CROSS-REFERENCE TO RELATED APPLICATIONS

This is a National Stage of PCT/EP99/03709, filed May 28, 1999 which claims priority to Italian Application Serial No. VE98A000023 filed Jun. 4, 1998, the disclosure of which is incorporated herein by reference.

1. Technical Field

The present invention relates to a method for manufacturing tube-shaped packages made of flexible material, to an apparatus for carrying out the method and to a package obtained thereby.

2. Background Art

Packages (containers) made of flexible material and used to contain coffee, biscuits and tea bags are known. In order to have a certain stability, these packages have a reinforced bottom produced by heat-sealing a preformed portion made of rigid material.

Packages having a square bottom obtained by folding a continuous strip are also known.

Packages are also known which have lateral reinforcements arranged on the inside or on the outside of the side walls, again with the aim of ensuring a certain stability for the package.

All these conventional packages suffer some drawbacks and in particular:
producing their bottom is a rather labour-intensive task;
their stability is unreliable;
they lose their shape when the product is introduced;
they adopt shapes which are poorly suited to space optimization (transport, shelves).

DISCLOSURE OF THE INVENTION

The aim of the present invention is to eliminate these drawbacks and to provide a method which allows to manufacture packages with a reinforced bottom in a simple and easy manner.

Within this aim, an object of the present invention is to provide a method which allows to use an apparatus which is in-line with respect to the filling station or directly after the formation of the bag.

This aim, this object and others which will become apparent from the description that follows are achieved, according to the invention, with a method for manufacturing tube-shaped packages made of flexible material, characterized in that an annular portion is pushed inward in a U-shaped arrangement at at least one closed end of the tube-shaped package, said annular portion being at least partially heat-sealed to the remaining part of the package at facing portions thereof.

BRIEF DESCRIPTION OF THE DRAWINGS

Further characteristics and advantages of the present invention will become apparent from the following detailed description of some preferred embodiments illustrated only by way of non-limitative example with reference to the accompanying drawings, wherein:

FIGS. 1–4 are views of an apparatus according to the invention during four different steps of the preparation of a package;

FIGS. 5–7 are views of a different apparatus in a different operating method;

FIG. 8 is a perspective view of the bottom of a package obtained with the apparatus;

FIGS. 9 and 10 are views of an apparatus for producing already-filled in packages; and FIGS. 11 and 12 are views of a different apparatus.

WAYS OF CARRYING OUT THE INVENTION

As shown by the figures, the method according to the invention uses an apparatus which is arranged downstream of a conventional forming or packaging machine (not shown in the drawings) of the vertical type, of which only the final filler tube 2 has been shown. The tube is square in the illustrated example, but it can also be circular, elliptical, etcetera.

In particular, the apparatus comprises an inner element 4 which has the same shape as the tube and can move vertically by means of conventional devices which are not part of the invention. The inner element is located inside the tube 2 and is provided, at its lower end, with a collar 6 whose external dimensions substantially correspond to those of the tube 2.

A plunger 8 is provided so as to face the inner element 4 coaxially and has the same cross-section as the collar but smaller dimensions.

Two pairs of heat-sealing bars 10 are provided to the sides of the apparatus and can move toward and away from the apparatus, for example by means of hydraulic jacks 12 to which the heat-sealing bars are rigidly coupled. The heat-sealing bars 10 can also be the same heat-sealing bars provided with a cutter which are used to heat-seal the bottom of the package and separate it from the flexible film that arrives from the reel. In particular, said heat-sealing bars can be constituted by heat-sealing devices of the induction, impulse, hot-air, radio-frequency, ultrasound and laser types.

Conventional narrow conveyor belts 14 for the advancement of a flexible film 16 wrapped on the tube 2 and already heat-sealed at its longitudinal flaps are further provided to the sides of the tube.

Use of the apparatus in this embodiment entails wrapping the ribbon of flexible film 16 (plastics, aluminum, paper) that arrives from the reel on a forming collar which is arranged upstream of the tube 2 in order to form a continuous-tube package, whose bottom 17 is heat-sealed with conventional methods by the heat-sealing bars 10.

During this step, the inner element 4 is completely accommodated in the tube 2 and the surface of the collar 6 forms, together with the surface of the tube, a substantially continuous surface (see FIG. 1).

Then the inner element 4 is made to protrude from the forming tube 2 so that the package moved by the conveyor belts 14 shows an annular portion 18 which is substantially twice as high as the reinforced bottom to be provided in the package (see FIG. 2).

Then the collar 6 is made to rise again partially and the plunger 8 is then raised, partially entering the collar 6 so as to cause the insertion, in a U-shaped configuration, of the annular portion 18 in the package and accordingly form an annular skirt 20 which fully surrounds the collar 6 (see FIG. 3). The rise of the inner element 4 and of the collar 6 is then actuated, returning the collar to its original position; at the same time, the heat-sealing bars 10 are made to advance, heat-sealing the two flaps of the skirt 20 so that the inner sides face each other, using the plunger 8 as an abutment.

Then the product is introduced in the tube 2 and the package, after being heat-sealed at the top end, is sent to the subsequent treatments.

In a different embodiment (not shown in the drawings), the collar 6 is affected by a plurality of openings matched by hot regions in the heat-sealing bars: this embodiment allows to heat-seal the skirt, albeit by discontinuous regions, without having to lift the inner element 4.

In a second embodiment illustrated in FIGS. 5 and 7, the method entails introducing the plunger 8 in the tube 2, moving a portion of flexible film so as to form an annular skirt 20 as in the preceding case. Particular heat-sealing bars 110 are then made to advance toward the skirt; the heat-sealing bars are provided with suckers 112 which, together with the plunger 8, remove the skirt from the collar 6. Once the skirt 20 has been removed from the collar 6, the heat-sealing bars 10 perform their heat-sealing action, again using the plunger 8 as an abutment. The product is then introduced in the tube and the package is sent to the subsequent treatments.

In particular cases, the package, after the skirt 20 has been formed and heat-sealed, is cut from the remaining part of continuous film 16 and is flattened at its ends so as to form two flaps which are subsequently heat-sealed. The package is then opened at the other end to be filled with the product.

In order to ensure greater stability of the resulting package, the film that constitutes the package may be affected by transverse reinforcement bands of the same material or of another material which, during the formation of the package, are located exactly at the region that forms the skirt. This solution has the further advantage of obtaining a more stable package.

In order to further ensure a pleasant aesthetic appearance of the package, the method entails inserting a corresponding contoured element in the hollow bottom thus formed and delimited by the skirt.

The embodiment shown in FIGS. 9 and 10 is an apparatus of the horizontal type for forming packages with the product already inserted therein.

In this embodiment, the apparatus comprises a chamber 22 for accommodating the package; said chamber is formed by four movable walls 24 which are constituted by heat-sealing bars provided with grip suckers 26 and by two heat-sealing plungers 28 which can move axially toward the inside of said chamber. In particular, the heat-sealing bars 24 have longitudinal dimensions which substantially correspond to the dimensions of the tube designed to form the package.

The method according to the invention, in this embodiment, entails firmly retaining the package, now closed at its ends, at the lateral surfaces by means of the suckers 26 of the heat-sealing bars 24 and then axially inserting the plungers 28 so as to form, at the two ends, two annular skirts 30 which, by way of the thermal action of the bars 24 and of the abutment of the plungers 28, are heat-sealed so that the internal surfaces face each other.

In the embodiment illustrated in FIGS. 11 and 12, the plungers have been replaced by the use of pairs of heat-sealing bars 32 which are articulated to the ends of the walls 24 and which, upon rotation, cause the retraction of the bottom into the chamber so as to form, in this case too, an annular skirt 30.

The present invention has been illustrated and described in a preferred practical embodiment and in some constructive variations thereof, but it is understood that other constructive variations may be applied in practice to it without thereby abandoning the scope of the protection of the present invention.

The disclosures in Italian Patent Application No. VE98A000023 from which this application claims priority are incorporated herein by reference.

What is claimed is:

1. A method for manufacturing a tube-shaped package having continuous tubular longitudinal sides and a continuous tubular bottom and made of flexible material, comprising the steps of:

sealing longitudinal sides of a flexible material to form a continuous tube, then sealing to close end of the continuous tube, then forming a closed bottom of the continuous tube by pushing an annular portion of the sealed end inwardly into a continuous tubular U-shaped arrangement at said closed end of the tube shaped package, the continuous tubular U-shaped arrangement comprising opposing flaps that face each other around the continuous arrangement, said flaps being at least partially heat-sealed to each other around the continuous U-shaped arrangement.

2. The method according to claim 1 wherein a flexible film is used which is transversely affected by reinforcement bands at the regions where the U-Shaped arrangement is produced during formation.

3. The method according to claim 1, wherein a corresponding contoured element is applied to a hollow bottom.

4. An apparatus for manufacturing a tube-shaped package, comprising: elements for retaining side walls of the tube-shaped package, the package having at least one continuous tubular closed end and the side walls being sealed to form a closed perimeter prior to forming the closed end; means that can be inserted axially at least partially in said elements for retaining said side walls so as to form, at said closed end, a continuous tubular annular portion that is folded in a continuous tubular U-shape; and means for heat sealing said annular portion folded in a continuous tubular U-shaped arrangement at the closed end.

5. The apparatus of claim 4 further comprising narrow conveyor belts for effecting advancement of the package from a location on the outside of the side walls of the tube-shaped package.

* * * * *